June 19, 1951 J. B. ALEXANDER 2,557,064
FLUID FILTER
Filed Oct. 1, 1948
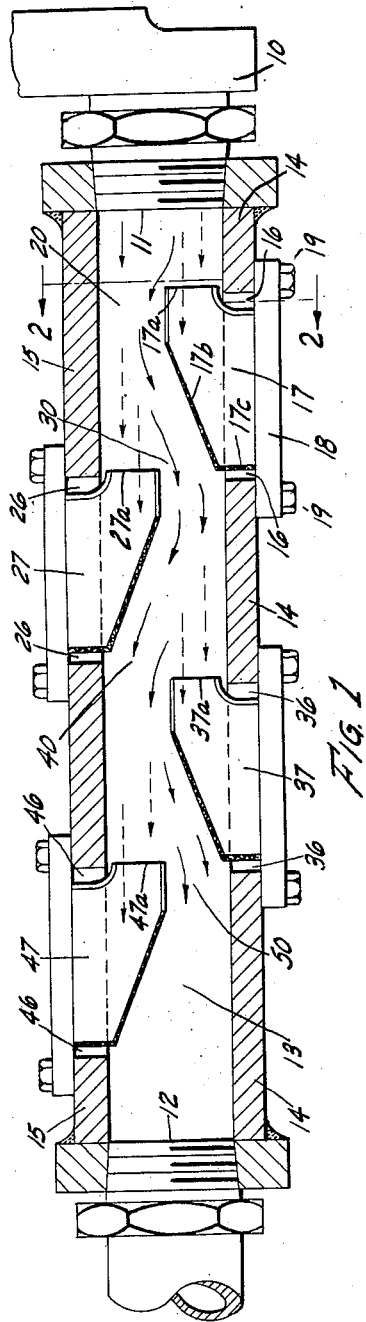
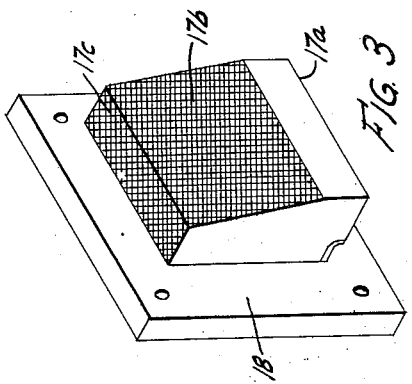
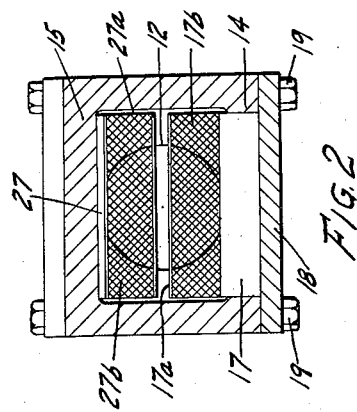
JAMES B. ALEXANDER,
INVENTOR,
BY
ATTORNEY.

Patented June 19, 1951

2,557,064

UNITED STATES PATENT OFFICE 2,557,064

FLUID FILTER

James B. Alexander, Cudahy, Wis., assignor to Bucyrus-Erie Company, South Milwaukee, Wis., a corporation of Delaware Application October 1, 1948, Serial No. 52,246

2 Claims. (Cl. 210—165)

My invention relates to new and useful improvements in filters for fluid circulating systems, more particularly to filters used to purify oil in hydraulic systems for the control of tractor equipment.

In such systems the presence of even a very small amount of dirt or abrasive foreign matter can cause damage to and adversely affect the operation of the hydraulic controls. Hence rapid and efficient filtering of foreign solids from the circulating system is imperative. Furthermore this filtering must be accomplished without appreciably retarding flow upon which operation of the equipment depends, and it must be possible to remove the solids from the filter and/or replace the filter quickly and conveniently in the field without disassembling the main hydraulic circuit.

Accordingly the principal object of my invention is to provide a highly-efficient, quick-acting filter for a fluid circulating system.

A further object of my invention is to provide a filter that does not appreciably impede normal flow of fluid in the circulating system in which it is placed.

A further object of my invention is to provide a filter that is simple, inexpensive, compact and easily removable from the circulating system in which it is placed.

In addition to the objects above stated, I have worked out a number of novel and useful details, which will be readily evident as the description progresses.

My invention consists in the novel parts, and in the combination and arrangement thereof, which are defined in the appended claims, and of which one embodiment is exemplified in the accompanying drawings, which are hereinafter particularly described and explained.

Throughout the description, the same reference number is applied to the same member or to similar members.

Referring now to the accompanying drawings, it will be seen that:

Figure 1 is a side view, partly in section, of my invention, showing my arrangement of filter elements in a straight section of pipe of an hydraulic circulating system.

Figure 2 is a cross-sectional view, taken along the line 2—2 of Figure 1.

Figure 3 is a view in parallel perspective of one of the filter elements removed from the pipe.

Referring now to the figures, we see that 11 and 12 represent the inlet and outlet respectively of a fluid conduit 13 in an hydraulic circulating system. This conduit may be located at the exit port of a pump 10 (fragment only shown in the drawing), although this is not essential. Conduit 13 is shown straight, though this is not essential. Side wall 14 of conduit 13 is provided with an opening 16 adjacent inlet 11 of the conduit. A filter element 17, mounted on face plate 18, is inserted through opening 16 and is secured in place by bolting face plate 18 to wall 14 by means of bolts 19. The filter element 17, thus inserted, extends across about one-half of the conduit. The other half of the conduit constitutes an unobstructed passage 20 for the fluid.

Filter element 17 is in the form of a pocket projecting inwardly from face plate 18 into the conduit. Its opening 17a faces inlet 11 of the conduit, and its inner side 17b is inclined in the direction of flow, toward wall 14 of the conduit. Its inner side 17b and end 17c (toward outlet) are perforated in the form of a filter screen (see Figure 3).

By placing filter element 17 across only part of the conduit, leaving passage 20 unobstructed, it is possible to avoid impeding flow of fluid when the filter screen becomes clogged with foreign particles, since such normal flow is well within the capacity of passage 20. Flow that is beyond the capacity of the filter element 17 to transmit is deviated around the filter element into and through passage 20 (see stream lines indicated by full arrows in Figure 1). Accordingly the velocity of flow through passage 20 is considerably greater than through the inlet of the conduit. Foreign particles (indicated by broken arrows in Figure 1), being heavier than the fluid, do not however, follow the stream lines (indicated by full arrows in Figure 1) through passage 20, but tend rather to pass straight on into the filter and are trapped on the inside of the screened walls 17b and 17c of the filter element.

Such an arrangement, is, however, not entirely satisfactory, since foreign particles in only that portion 17a of the flow intersected by the filter element 17 are filtered out of the fluid. Accordingly I have provided the following further means for filtering foreign particles from the passage 20, without impeding flow. On the opposite side wall 15 of conduit 13, I have provided another opening 26 through which a second filter element 27 is inserted and bolted in place in the same manner as the first filter element. This second filter element 27 extends across the other one-half of the conduit (i. e., in line with passage 20), but is axially spaced along the conduit behind the first filter element 17 in the direction of flow, so that an unobstructed passage 30 for fluid is provided between the filter element 27 and the opposite wall 14 of the conduit. In this manner the entire cross-section of the conduit is intersected by filter elements, without impeding normal flow. Foreign particles (indicated by broken arrows in Figure 1) that pass through the first passage 20, alongside the first filter element 17, tend to pass straight into the opening 27a of the second filter 27, whereas the lighter fluid is deviated around filter element 27 and passes through passage 30.

A second pair of filter elements 37 and 47 in walls 14 and 15 respectively may be similarly located respectively in openings 36 and 46, in staggered relation farther along the conduit in the direction of flow, to filter out any remaining foreign particles. It will be noted that fluid approaching each of these filter elements 37 and 47 is directed outwardly toward the wall of the conduit by the direction of the winding passage 20, 30, 40, 50. Accordingly, heavier particles in the fluid will be thrown outwardly by centrifugal force and tend to enter the openings 37a and 47a of the filter elements, leaving relatively pure the fluid that passes through passages 40 and 50.

In other words, my filter may be described as consisting of a plurality of removable filter elements which are spaced axially along and circumferentially around the inside of a conduit, each filter element partially intersecting the conduit so that its entrance is adjacent and in parallel with the entrance of an unobstructed fluid passage in said conduit. In the embodiment shown, the filter elements are in pairs circumferentially spaced at 180 degrees around the inside of the conduit, but any other number of elements with angular spacing sufficient to filter the entire cross-sectional area of the conduit could be used. Furthermore, in the embodiment shown, the axial spacing of the filter elements is approximately equal to the longitudinal dimension of the filter elements, but other spacings could be used. In general a closer spacing would be used with smaller angular spacing of a greater number of elements.

Having now described one embodiment of my invention, I wish it to be understood that my invention is not to be limited to the specific form or arrangement of parts herein described and shown.

Thus, it is evident that the particular form of the filter element shown in the drawings is merely illustrative of one possible embodiment, many suitable variations being feasible, for example, in number, location, extent, shape, and type of screening and trapping elements in the filter, except insofar as restricted by my claims.

Furthermore, although the invention has been described in its application to a high-velocity oil circulating system commonly used to actuate tractor equipment, it is to be understood that the same is equally applicable to other liquid and fluid circulating systems.

I claim:

1. A filter for a fluid circulating system, comprising: a fluid conduit; a plurality of inwardly projecting filter elements, spaced closely adjacent each other along the conduit alternately on opposite sides thereof; each filter element intersecting approximately half of the interior of the conduit to provide within the conduit a filtered fluid passage through said element and an adjacent unobstructed passage outside said element, said two passages being in parallel; each filter element further being in the form of a pocket with its mouth facing upstream, and with its inner will sloping outwardly toward the adjacent wall of the conduit in a downstream direction and consisting at least in part of a filter-screen.

2. A filter according to claim 1, further characterized by the fact that the wall of the conduit has a plurality of holes extending therethrough, each hole being of a size to permit the ready insertion therethrough of one of the filter elements, and that each filter element includes a portion adapted to seal the hole after the insertion of the filter element, and that there are means for sealably securing this portion to the conduit.

JAMES B. ALEXANDER.

REFERENCES CITED

The following references are of record in the file of this patent:

UNITED STATES PATENTS

| Number | Name | Date |
| --- | --- | --- |
| 1,364,435 | Harris | Jan. 4, 1921 |
| 1,605,022 | Hapgood | Nov. 2, 1926 |
| 1,889,325 | Whaley | Nov. 29, 1932 |
| 1,908,329 | Dunham | May 9, 1933 |
| 1,987,847 | Flood | Jan. 15, 1935 |